(No Model.)
W. C. FULLER.
ELECTRIC BELT.
No. 513,387. Patented Jan. 23, 1894.
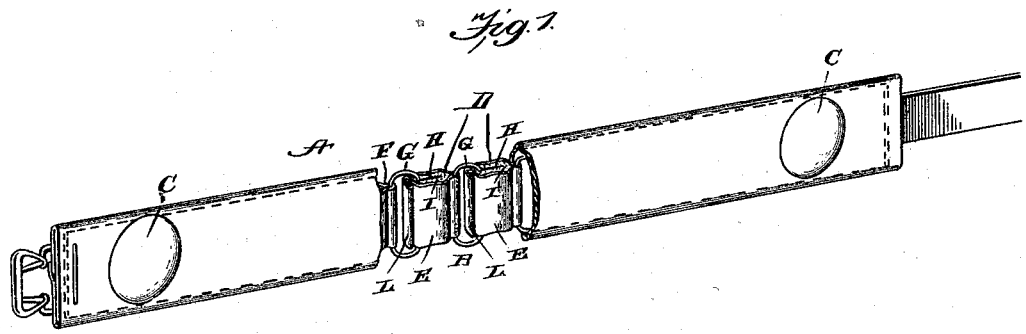
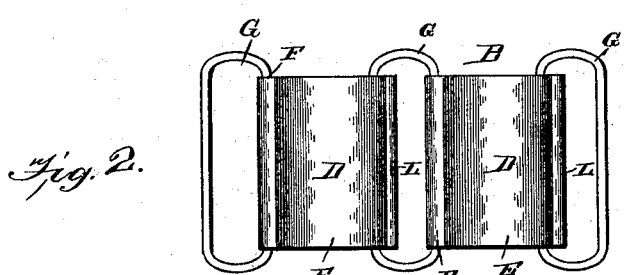
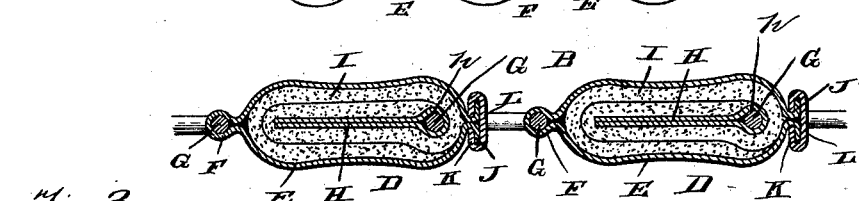
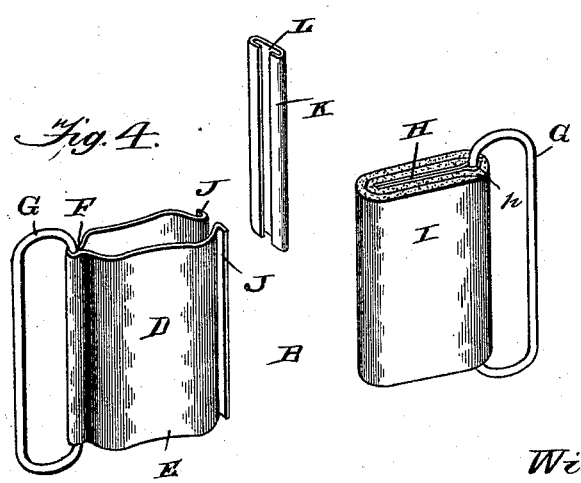
Witnesses
Inventor
Willie C. Fuller.
By his Attorneys.

UNITED STATES PATENT OFFICE.

WILLIE C. FULLER, OF SALINA, KANSAS.

ELECTRIC BELT.

SPECIFICATION forming part of Letters Patent No. 513,387, dated January 23, 1894.

Application filed October 11, 1893. Serial No. 487,838. (No model.)

*To all whom it may concern:*

Be it known that I, WILLIE C. FULLER, a citizen of the United States, residing at Salina, in the county of Saline and State of Kansas, have invented a new and useful Electric Belt, of which the following is a specification.

This invention relates to electric belts; and it has for its object to provide certain improvements in belts of this character, whereby the cells comprising the battery employed in the belt shall be renewable.

To this end the main and primary object of the invention is to construct an electric belt battery, of cells which shall have the elements subject to rapid decomposition capable of being conveniently removed and replaced by fresh or new elements of the same character without injury to the other elements, thereby providing a construction which renders the battery of almost a practically permanent character, and any one of the parts of which may be easily repaired without affecting the other part.

With these and other objects in view which will readily appear as the nature in the invention is better understood, the same consists in the novel construction, combination and arrangement of parts hereinafter more fully described, illustrated and claimed.

In the accompanying drawings:—Figure 1 is a perspective view partly in section of an electric belt embodying the improvements claimed herein. Fig. 2 is an enlarged elevation of a portion of a battery showing two cells thereof. Fig. 3 is a longitudinal sectional view of the construction shown in Fig. 2. Fig. 4 is an enlarged detail in perspective of one of the cells, the several parts of which are separated from each other to show clearly the method of replacing a new zinc in the place of the one removed.

Referring to the accompanying drawings, A represents a body belt, in which is incased a cell battery B, the terminals of which are connected to the end electrodes C, in any suitable manner. The cell battery B, comprises a connected series of battery cells D. Each of the battery cells D, is provided with an outer U-shaped copper casing element E. The U-shaped copper casings forming the outer element of each cell, are provided at their closed ends with the integral eyes F, which pivotally and permanently receive one of the side portions of the metallic connecting links G, which electrically connect the cells together, and the other side portions of which loosely receive the inner zinc plates H. The inner zinc plates H, preferably comprise a piece of this metal bent upon itself to form at one end a connecting eye *h*, embracing the connecting links, and said zinc plates are adapted to be loosely surrounded by an absorbent packing I, which is placed together within the U-shaped copper casing E, and is adapted to be held therein when the battery is in use. The U-shaped copper cell casings E, are open at one end to provide for the convenient removal and replacement of the absorbent packing I, and the inclosed zinc plates H, and at such open end the opposite sides of the cell casing terminate in the outturned flanges J, which are adapted to be engaged by the inturned retaining flanges K, of the removable lock caps L. The removable lock caps L, are adapted to be slid into engagement with the flanged ends of the cell casings, so as to confine such ends in the inturned flanges K, thereof, and thereby provide for securely and temporarily closing the open end of the cell. When the absorbent packing or the zinc have become decomposed or worn out, the lock caps L, can be readily slid out of engagement with the flanged ends of the cell casings, so that such casings can be easily spread open and the decomposed parts removed and replaced by fresh or new elements of the same character, after which the cap or caps are slid back into locking engagement with the flanged ends of the cell casing.

The cell battery constructed as described is used in the ordinary manner, it being obvious from the drawings that the absorbent packing is arranged so that the same will freely expand when saturated with a suitable electrolyte and will also admit of air being blown therethrough to drive out the moisture when desired and not in use, and I will further have it understood that to secure the results claimed, changes in the form, proportion and the minor details of construction may be resorted to without departing from the principle or sacrificing any of the advantages of this invention.

Having thus described the invention, what is claimed, and desired to be secured by Letters Patent, is—

1. In an electric belt, the combination of the battery cells each comprising an outer permanent casing forming one of the elements and open at one end, a renewable inner element and surrounding absorbent packing adapted to be inclosed within the casing, and a removable lock cap for the open end of the casing, substantially as set forth.

2. The combination with the inner renewable element and surrounding absorbent packing; of the outer U-shaped element having flanged ends, and a removable lock cap adapted to be slid in and out of engagement with the flanged ends of the outer element, substantially as set forth.

3. The combination with the inner element and surrounding absorbent packing; of the U-shaped outer element having out-turned flanges at the extremities of its sides, and a removable lock cap having inturned retaining flanges adapted to removably engage the out-turned flanges of said outer element, substantially as set forth.

4. In an electric belt, the combination of the battery cells each comprising an outer permanent casing element open at one end and provided at its closed end with an eye, a renewable inner element and surrounding packing absorbent adapted to be inclosed within the casing element, and a removable lock cap for the open end of the casing, and metallic connecting links engaging the renewable inner element and the eye at one end of the casing, substantially as set forth.

In testimony that I claim the foregoing as my own I have hereto affixed my signature in the presence of two witnesses.

WILLIE C. FULLER.

Witnesses:
R. P. EORENS,
SMITH GEORGE.